US012391531B2

(12) United States Patent
He

(10) Patent No.: US 12,391,531 B2
(45) Date of Patent: Aug. 19, 2025

(54) PIERCING TOOL FOR BREAKING SEALED PACKAGING

(71) Applicant: Juan He, Guangdong (CN)

(72) Inventor: Juan He, Guangdong (CN)

(*) Notice: Subject to any disclaimer, the term of this patent is extended or adjusted under 35 U.S.C. 154(b) by 0 days.

(21) Appl. No.: 18/941,707

(22) Filed: Nov. 8, 2024

(65) Prior Publication Data

US 2025/0153990 A1 May 15, 2025

(30) Foreign Application Priority Data

Nov. 9, 2023 (CN) ......................... 202323028909.1

(51) Int. Cl.
*B67B 7/00* (2006.01)

(52) U.S. Cl.
CPC ...................................... *B67B 7/24* (2013.01)

(58) Field of Classification Search
CPC .... B67B 7/42; B67B 7/24; B67B 7/26; B67B 7/28
USPC ............................................. 222/87; 81/3.48
See application file for complete search history.

(56) References Cited

U.S. PATENT DOCUMENTS 755,789 A * 3/1904 Norton ...................... B67B 7/24 30/443
1,657,782 A * 1/1928 Berg ......................... B67B 7/12 222/145.1
4,158,417 A 6/1979 Inoue
5,017,078 A 5/1991 Ingwersen et al.
5,255,492 A 10/1993 Larson
5,630,529 A * 5/1997 Chlupp ................ B67D 3/0083 222/88
6,536,192 B2 3/2003 King et al.
6,792,738 B2 9/2004 Robinson
6,916,147 B2 7/2005 Suh
2019/0218087 A1* 7/2019 Clark ..................... A47G 19/22

FOREIGN PATENT DOCUMENTS

DE 20005990 U1 * 7/2000 ............... B67B 7/24

OTHER PUBLICATIONS

Translation DE20005990U1 (Year: 2000).*

* cited by examiner

*Primary Examiner* — Tom Rodgers

(57) ABSTRACT

A piercing tool for breaking sealed packaging includes a body for placing a target item. A barrel is provided on one sidewall of the body; a piercing component is slidably installed inside the barrel, and a piercing member arranged on the piercing component may enter the body along the barrel. An elastic element is connected to both the body and the piercing component. The piercing member is displaced from the body into the barrel to cause elastic deformation of the elastic element. A first limiting structure capable of resisting the elastic force is provided between the barrel and the piercing component to restrict the piercing member within the barrel. After the target item is fixed within the body, the piercing member springs back into the body along the barrel under the elastic force of the elastic element to quickly pierce the sealed packaging.

2 Claims, 3 Drawing Sheets

PIERCING TOOL FOR BREAKING SEALED PACKAGING

CROSS REFERENCE TO RELATED APPLICATIONS

This application claims priority benefits to Chinese Patent Application No. 2023230289091, filed on Nov. 9, 2023, the contents of which are incorporated herein by reference.

TECHNICAL FIELD

The present disclosure relates to the technical field of piercing tools, and in particular, relates to a piercing tool for breaking sealed packaging.

BACKGROUND

Sealed containers or packaging bags have gradually become an important means for the long-term storage of beverages and other products. The containers or the packaging bags are sealed after the product is placed inside to ensure that the contents remain within the containers or the packaging bags during transportation, storage, and sale, while preventing contamination and damage. Various sealing methods and materials are used, such as sealing by adhesive, heating or stitching, etc. In the related art, specialized tools for breaking open sealed containers or packaging bags, such as can openers and punchers, are used in the case when pull tabs are damaged or rapid discharge of contents is needed. However, some packaging materials are designed with curved shapes and/or made of metal, which may cause slipping during cutting. If the force applied is insufficient, the packaging cannot be broken; while if too strong, liquid splashing may be caused. Thus, the tools currently available present several inconveniences when breaking the sealed containers or the packaging bags. Therefore, providing a piercing tool that may address these issues has become an urgent necessity.

SUMMARY

The embodiments of the present disclosure provides a piercing tool for breaking sealed packaging, including: a body, having a hollow interior and an opening in communication with the hollow interior, and configured for placing a target item; a barrel, provided on a sidewall of the body and an inside of the barrel in communication with the hollow interior of the body; a piercing component, slidably disposed inside the barrel and a piercing member arranged on the piercing component being capable of entering the hollow interior of the body from the inside of the barrel; and an elastic element, one end of the elastic element being connected to the body and another end of the elastic element being connected to the piercing component. The piercing member is capable of moving from the hollow interior of the body into the inside of the barrel to allow the elastic element to undergo elastic deformation, and a first limiting structure capable of resisting an elastic force of the elastic element is provided between the barrel and the piercing component to restrict the piercing member within the barrel.

BRIEF DESCRIPTION OF THE DRAWINGS

The description and drawings that constitute a part of the present disclosure are provided for a further understanding of the present disclosure. The illustrative embodiments and their descriptions are provided for explanation but do not constitute improper limitations on the present disclosure.

DETAILED WAY

Figure 1:
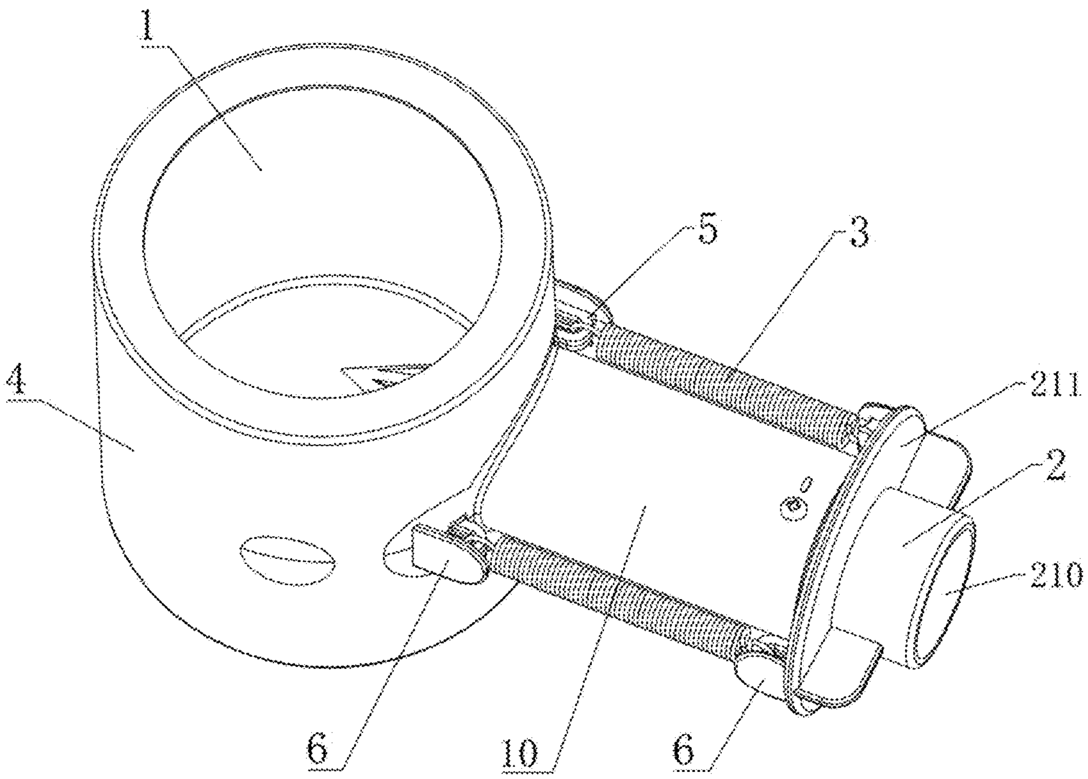
FIG. 1 is a perspective view of a piercing tool for breaking sealed packaging in accordance with the embodiments of the present disclosure.
Figure 2:
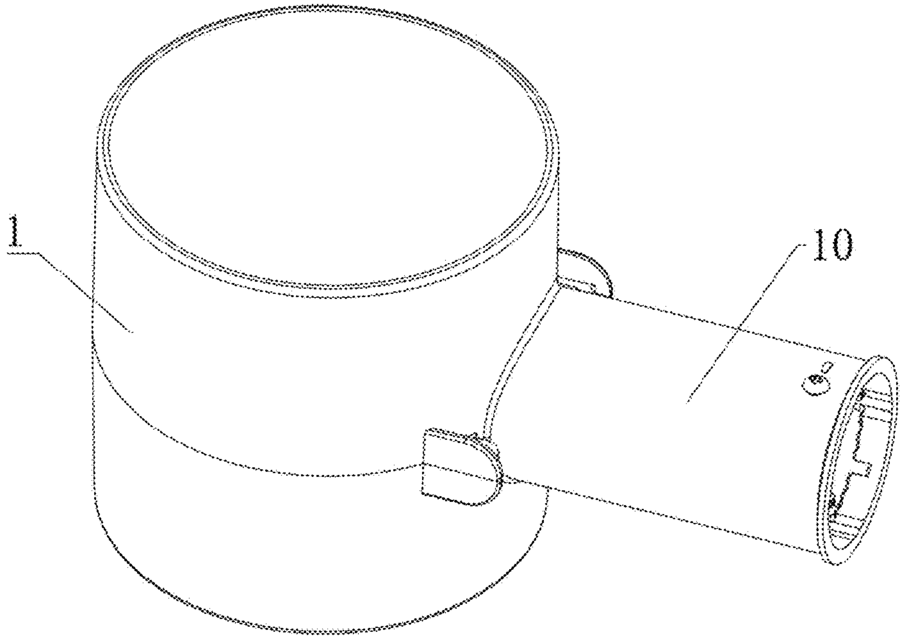
FIG. 2 is a perspective view of a body and a barrel in accordance with the embodiments of the present disclosure.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of one embodiment may be used according to another embodiment to produce yet another embodiment. Therefore, it is intended that the present disclosure includes such modifications and variations within the scope of the appended claims and their equivalents.

In the description of the present disclosure, the terms "longitudinal", "lateral", "upper", "lower", "front", "back", "left", "right", "vertical", "horizontal", "top", "bottom" and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms "connected", "connecting" and "arranged" used in the present disclosure should be understood in a broad sense. For example, it may be a fixed connection or a detachable connection; it may be directly connected or indirectly connected through an intermediate component; it may also be a wired electrical connection, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

Currently, from the perspective of market trends, products with sealed containers or packaging bags have captured a large portion of the market. Due to their excellent preservation effects, they have become a preferred method for extending the shelf life of food and semi-processed products. Common examples include packaged beverages, condiments, and canned goods. Typically, conventional product packaging is designed with only one opening, which is sealed and needs to be opened with specific opening tools. When pouring liquids from these packages, the flow is relatively slow because the opening is blocked by the liquid, preventing air from entering smoothly. To allow the liquid to flow out quickly and smoothly, an additional vent hole is needed for facilitating air entry into the sealed container, enabling stable and rapid liquid discharge. Consequently, various devices and tools for opening sealed packaging, such as can openers and punchers, have emerged in the market.

The inventors of the present disclosure have discovered that current tools for opening sealed packaging are often unreliable and require significant manual effort. Forcefully breaking open the packaging may lead to liquid splashing, while gentler methods may cause extensive deformation of the packaging and are time-consuming and labor-intensive. The breaking methods in the related art are not user-friendly, particularly for individuals with less strength, such as some women. For example, when opening canned beverages, attempting to piercing the curved sidewall may easily result in slipping and potential injury, posing safety risks.

The inventor of the present disclosure has designed a relatively reliable piercing tool with reference to the above-mentioned related art, and the specific scheme is as follows.

As shown in FIG. 1 to FIG. 6, according to the embodiments of the present disclosure, a piercing tool for breaking sealed packaging is provided, which includes a body 1 having a hollow interior and an opening in communication with the hollow interior. The body 1 is configured for placing a target item. A barrel 10 is provided on a sidewall of the body 1. A piercing component 2 is slidably mounted inside the barrel 10, and a piercing member 22 arranged on the piercing component 2 may enter the hollow interior of the body 1 along the barrel 10. An end of an elastic element 3 is connected to the body 1 and another end of the elastic element 3 is connected to the piercing component 2.

The piercing member 22 moves from the interior of the body 1 into an inside of the barrel 10, causing the elastic element 3 to undergo elastic deformation. A first limiting structure capable of resisting the elastic force of the elastic element 3 is provided between the barrel 10 and the piercing component 2, allowing the piercing member 22 to be restricted in the barrel 10 by the first limiting structure.

In some embodiments, the body 1 may be of various sizes and shapes, which may be designed according to the shape of the outer packaging of the product that needs to be pierced. For example, if the target item that needs to be pierced is a canned beverage, the body 1 is designed as a barrel structure that matches with the can. The body 1 may have other different structural shapes. The barrel 10 may be integrally formed with the body 1. The barrel 10 is arranged on one side of the body 1 and is provided with the piercing component 2. The piercing member 22 arranged on the piercing component 2 may enter the interior of the body 1 along the barrel 10, thereby piercing the sealed container placed inside the body 1. Two ends of the elastic element 3 are connected to the piercing component 2 and the body 1 respectively. After the piercing member 22 moves from the interior of the body 1 to the inside of the barrel 10, the elastic element 3 is in a force storage state. When a canned beverage is placed inside the body 1, the stored force of the elastic element may be released, allowing the piercing member 22 to quickly spring back to the interior of the body 1, thus piercing a hole in the sealed container of the canned beverage. To facilitate the placement of canned beverage inside the body 1, a first limiting structure is provided to restrict the piercing member 22 within the barrel 10.

In one embodiment, the first limiting structure may be a limiting groove defined in the barrel 10 and a limiting protrusion provided on the piercing component 2. When the limiting protrusion is inserted into the limiting groove, the piercing component 2 may resist the elastic force of the elastic element 3, allowing the piercing member 22 to be restricted inside the barrel 10. The elastic element 3 may be a tension spring or a pressure spring. If a tension spring is used, it may be installed outside the barrel 10, and the force storage state of the tension spring is a stretched state. If a compression spring is used, it may be installed inside the barrel 10, and the force storage state of the pressure spring is a compressed state. Both implementation ways may allow the piercing component 2 to be manually pulled to put the elastic element 3 into the force storage state.

Figure 4:
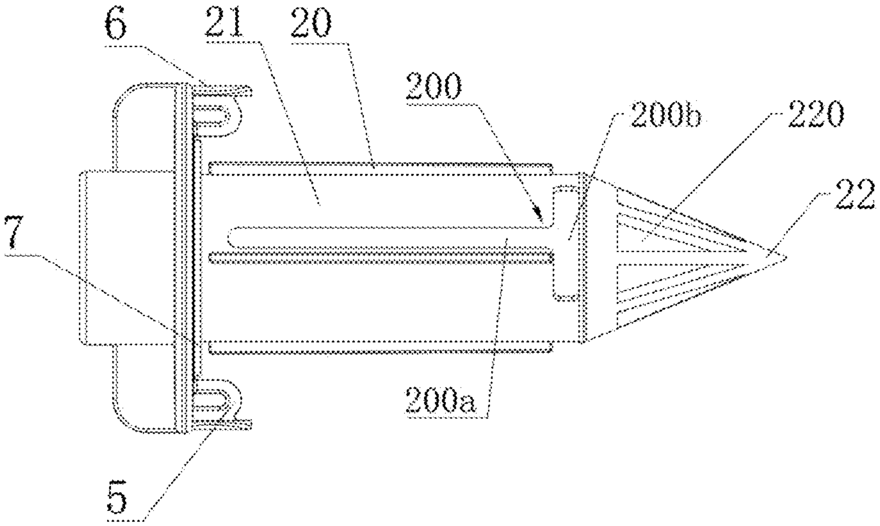
FIG. 4 is a perspective view of a piercing component in accordance with the embodiments of the present disclosure.

As illustrated in FIG. 1 and FIG. 4, In some embodiments, the piercing component 2 includes a rod body 21 having a hollow structure, one end of the rod body 21 is defined with a water outlet 210. A piercing member 22 is provided on another end of the rod body 21 away from the water outlet 210, and the piercing member 22 is defined with a water inlet 220 in communication with the water outlet 210, forming a flow channel inside the piercing component 2.

In some embodiments, the water outlet 210, the water inlet 220 and the hollow inside of rod body 21 may communicate with each other to allow the liquid to flow directly out from the water outlet 210 of the piercing component 2 after a hole is pierced. If the target item is a canned beverage, a user may drink directly from the water outlet 210. If the flow is not fast enough, the user may open a top of the can with the pull tab to allow air to enter, increasing the liquid flow rate.

Figure 5:
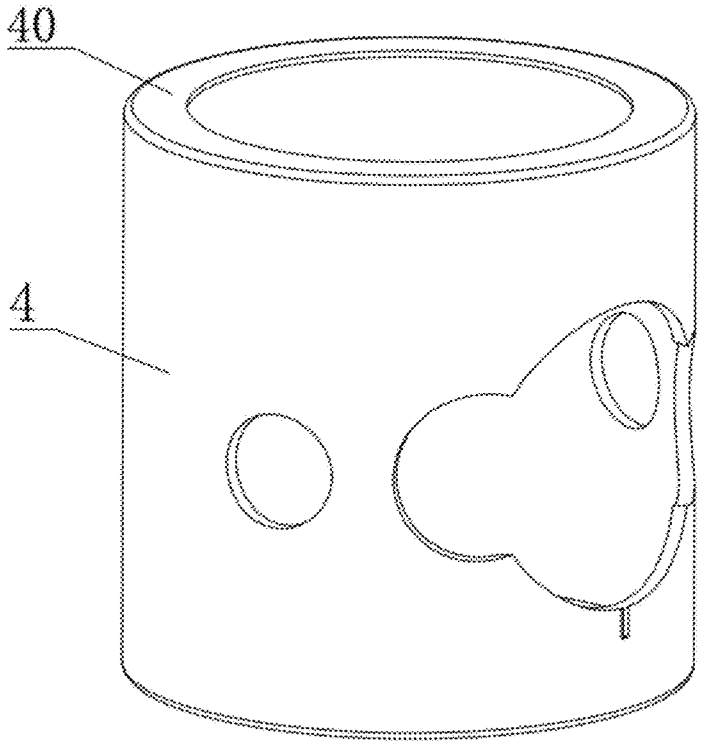
FIG. 5 is a perspective view of a sleeve in accordance with the embodiments of the present disclosure.
Figure 6:
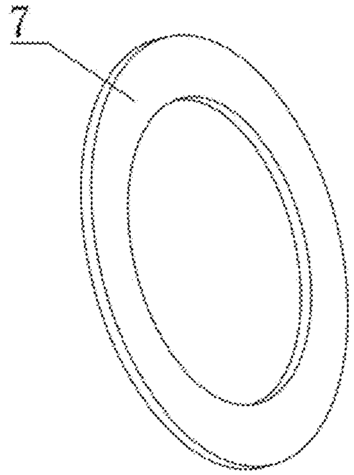
FIG. 6 is a perspective view of a flexible sealing ring in accordance with the embodiments of the present disclosure.

As illustrated in FIG. 1 and FIG. 5, In some embodiments, a sleeve 4 is provided on an outer surface of the body 1, and an annular sealing ring 40 extending circumferentially toward the opening of the body 1 is formed on the sleeve 4. The annular sealing ring 40 is located around the opening of the body 1 and is configured to wrap the outer wall of the target item, thereby forming a sealed space inside the body 1.

In some embodiments, the sleeve 4 is fixedly sleeved outside the body 1 and has an annular sealing ring 40, which extends inward and is located around the opening of the body 1. After the target item is placed in the body 1, the annular sealing ring 40 may fit tightly on the outer wall of the target item, thereby forming a closed or sealed space inside the body 1 to reduce liquid from leaking from the opening of the body 1.

Figure 3:
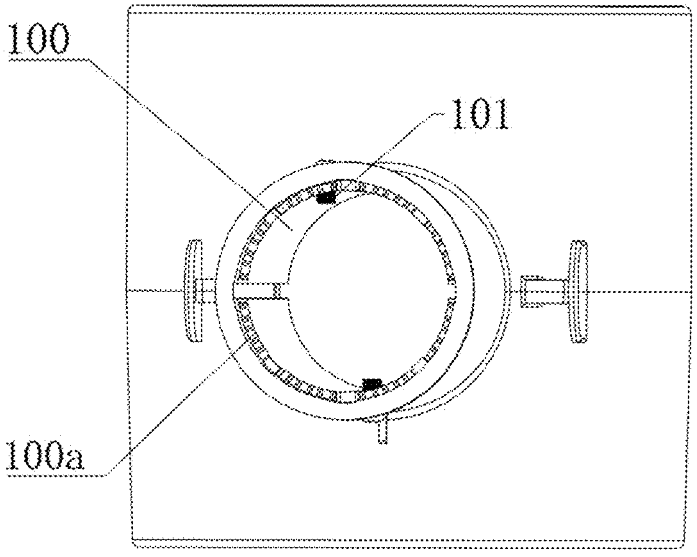
FIG. 3 is a perspective view of a first limiting structure of a barrel in accordance with the embodiments of the present disclosure.

As illustrated in FIG. 3 and FIG. 5, In some embodiments, the first limiting structure includes a plurality of raised walls 100 and a plurality of raised strips 20. The plurality of raised walls 100 is arranged on an inner wall of the barrel 10 and spaced at intervals, forming a plurality of guide channels for engaging with the plurality of the raised strips 20. Each raised strip 20 is arranged circumferentially on an outer wall of the rod body 21, and each raised strip 20 may engage with each guide channel in a one-by-one correspondence.

One end facing the piercing member 22 of each raised strip 20 may abut against an end surface away from the body 1 of a corresponding raised wall 100 under the elastic force of the elastic element 3.

In some embodiments, the first limiting structure may be formed by the plurality of raised walls 100 and the plurality of raised strips 20. When in use, the piercing component 2 may be pulled, allowing the raised strips on the rod body 21 to be off the guide channels, and then the rod body 21 may be rotated to allow one end of each raised strip 20 to abut against one end of each raised wall 100, thereby achieving the position-limiting effect. When piercing is needed, the rod body 21 may be rotated to allow the raised strips 20 to align with the corresponding guide channels. Thus, the raised strips 20 are reset under the guidance of the guide channels, releasing the elastic force of the elastic element 3. As a result, the piercing member 22 is driven to quickly and forcefully retract back into the interior of the body 1, completing the piercing operation.

In some embodiments, a toothed anti-slip portion 100*a* is provided on one end of the raised walls 100 away from the body 1, and each tooth pitch of the anti-slip portion 100*a* is matched with a width of one corresponding raised strip 20.

In some embodiments, a width of each tooth pitch of the anti-slip portion 100*a* is greater than the width of the raised strip 20, allowing the end of each raised strip to be embedded within the anti-slip portion 100*a*. This achieves a damping or resistance effect, which prevents the raised strip 20 from easily retracting under the force of the elastic element 3 and causing dangerous accidents.

As illustrated in FIG. 4 and FIG. 5, In some embodiments, the piercing tool also includes a second limiting structure, which is configured to limit a sliding distance of the piercing component 2 inside the barrel 10. The second limiting structure includes a limiting groove 200 and a limiting protrusion 101. The limiting groove 200 is arranged on the outer wall of the rod body 21 adjacent to a corresponding raised strip 20. The limiting protrusion 101 is installed on the inner wall of the barrel 10 corresponding to the limiting groove 200 and is located at an end away from the body 1 of a corresponding raised wall 100.

When the piercing component 2 is sliding inside the barrel 10, a groove wall of the limiting groove 200 proximal to the piercing member 22 may abut against the limiting protrusion 101.

In some embodiments, a second limiting structure may be provided between the barrel 10 and the piercing component 2, which includes a limiting groove 200 arranged on the rod body 21 and adjacent to a corresponding raised strip 20, and a limiting protrusion 101 fixedly mounted on the barrel 10. The limiting protrusion 101 may be embedded in the limiting groove 200, allowing the limiting protrusion 101 to abut against the groove wall proximal to the piercing member 22 of the limiting groove 200, ensuring that the entire piercing component 2 will not easily slip out of the barrel 10 due to the pulling force. Preferably, the limiting protrusion 101 is a screw rod fastened to the barrel 10, and its rod body penetrates the sidewall of the barrel 10 to form a protrusion on the inner wall of the barrel 10.

As shown in FIG. 5, In some embodiments, the limiting groove 200 includes a first groove 200*a* and a second groove 200*b* in communication with each other. The first groove 200*a* extends along a longitudinal direction of one corresponding raised strip 20 and may guide the limiting protrusion 101 into the second groove 200*b*. The second groove 200*b* is located on one side proximal to the piercing member 22 of the first groove 200*a*, and the second groove 200*b* extends along a radial direction of the rod body 21 to form an arc-shaped slideway for the limiting protrusion 101 to slide within.

In some embodiments, the limiting groove 200 may be divided into two grooves that realize different functions, which, for convenience of explanation, are defined as a first groove 200*a* and a second groove 200*b*. The first groove 200*a* may be arranged on the outer wall of the rod body 21 around the raised strip 20, forming two slide grooves corresponding to one raised strip 20. The limiting protrusion 101 may be selected to be embedded in one of the two slide grooves. The first groove 200*a* may be may also be arranged on one side of the corresponding raised strip 20 to form a slide groove. The second groove 200*b* is defined along the circumference of the rod body 21. When the first limiting structure includes the raised walls 100 and the raised strips 20, the rod body 21 is rotated to activate the limiting function. While the second groove 200*b* has three groove walls, of which a groove wall proximal to the piercing member is configured to engage with the limiting protrusion 101 to prevent the piercing component 2 from being slip out of the barrel 10, and the other two groove walls of the second groove 200*b* are also configured to engage with the limiting protrusion 101 to limit a maximum rotation angle of the rod body 21, avoiding the corresponding raised strip 20 being matched with other guide channels and unlocking the limiting function due to erroneous operation. It should be noted that when the guide channels formed by the raised walls 100 are evenly arranged, the above situation may occur. Therefore, the second groove 200*b* is provided in the limiting groove 200 to avoid the serious consequences caused by such failed operations.

As illustrated in FIG. 1 and FIG. 5, In some embodiments, a limiting boss 211 is provided on a sidewall proximal to the water outlet 210 of the rod body 21. The limiting boss 211 may abut against an end of the barrel 10 away from the body 1 under the elastic force of the elastic element 3, limiting a maximum sliding distance of the piercing member 22 as it enters inside the body 1 along the barrel 10.

In some embodiments, the limiting boss 211 may be configured to limit the maximum distance of the piercing component 2 sliding into the barrel 10 and may also be served as a grip to pull the piercing component 2.

As illustrated in FIG. 1 and FIG. 5, In some embodiments, one side surface facing the barrel 10 of the limiting boss 211, and one sidewall of the body 1, is provided with a connector 5 respectively. Each of two ends of the elastic element 3 is respectively connected to a corresponding connector 5.

In some embodiments, each connector 5 may be a mounting lug integrally formed with the limiting boss 211 or the body 1 respectively, facilitating the connection of the elastic element 3 to the mounting lugs.

As illustrated in FIG. 1 and FIG. 5, in some embodiments, one side surface facing the barrel 10 of the limiting boss 211, and the sidewall of the body 1, is provided with a baffle 6 respectively. Each baffle 6 matches with a corresponding connector 5, and each baffle 6 is located outside its corresponding connector 5. A flexible sealing ring 7 is provided between the limiting boss 211 and the end away from the body 1 of the barrel 10.

The flexible sealing ring 7 is fixed on one sidewall proximal to the barrel 10 of the limiting boss 211 or on one end away from the body 1 of the barrel 10.

In some embodiments, the baffle 6 may prevent one end of the elastic element from scratching a user's hand when holding the body 1. The flexible sealing ring 7 may not only achieve a sealing effect, but also buffer the limiting boss 211 due to its flexible characteristics when it abuts against the end of the barrel 10. This design extends the service life and reduces noise.

In summary, the present disclosure provides a piercing device for breaking sealed packaging. The device wraps a target item within a body. The piercing component inserts the spike portion into the body along the sleeve, and the elastic force of the elastic element allows the piercing member to quickly pierce the sealed container. With this structure, if the opening component of the sealed container is damaged, the piercing tool can more stably pierce the packaging. The hollow structure of the body can encase the pierced portion, helping to prevent liquid splatter. The piercing component, in conjunction with the elastic element, effectively pierces the sealed packaging with the elastic force, increasing the success rate of piercing and avoiding large-scale deformation caused by gentler opening operations. Moreover, when a faster liquid discharge is needed, the hole created by the piercing tool can form an air passage with the pre-set hole in the sealed packaging. During the liquid outflow, one hole serves as the liquid outlet while the other assists air entry into the packaging, significantly increasing the flow rate. This technical solution reduces operational difficulty, greatly decreasing both replacement time and operational intensity.

The above description is only some embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

What is claimed is:

1. A piercing tool for breaking sealed packaging, comprising:

a body, having a hollow interior and an opening in communication with the hollow interior, and configured for placing a target item;

a barrel, provided on a sidewall of the body, wherein an inside of the barrel is in communication with the hollow interior of the body;

a piercing component, slidably disposed inside the barrel, wherein a piercing member arranged on the piercing component is capable of entering the hollow interior of the body from the inside of the barrel; and an elastic element, wherein one end of the elastic element is connected to the body and another end of the elastic element is connected to the piercing component;

wherein the piercing member is capable of moving from the hollow interior of the body into the inside of the barrel to allow the elastic element to undergo elastic deformation, and a first limiting structure capable of resisting an elastic force of the elastic element is provided between the barrel and the piercing component to restrict the piercing member within the barrel;

wherein the piercing component comprises a rod body having a hollow channel, one end of the rod body is defined with a water outlet, another end of the rod body is arranged with the piercing member, and the piercing member is defined with a water inlet in communication with the hollow channel of the rod body and the water outlet;

wherein the first limiting structure comprises a plurality of raised walls and a plurality of raised strips;

the plurality of raised walls is arranged on an inner wall of the barrel to form a plurality of guide channels between adjacent raised walls;

the plurality of raised strips is arranged circumferentially on an outer wall of the rod body, and each raised strip is capable of engaging with the corresponding guide channel; and each raised strip has a proximal end facing the piercing member, each raised wall has a distal end surface away from the body, and the proximal end of each raised strip is capable of abutting against the distal end surface of the corresponding raised wall under the elastic force of the elastic element;

wherein the piercing tool further comprising comprises:

a second limiting structure, configured to limit a sliding distance of the piercing component within the barrel and comprising a limiting groove and a limiting protrusion;

wherein the limiting groove is arranged on the outer wall of the rod body and adjacent to the corresponding raised strip;

the limiting protrusion is arranged on the inner wall of the barrel and is located on the distal end surface of the corresponding raised wall; and a groove wall of the limiting groove is capable of abutting against the limiting protrusion in response to the piercing component sliding within the barrel.

2. The piercing tool for breaking sealed packaging according to claim 1, wherein the limiting groove comprises a first groove and a second groove in communication with each other;

the first groove extends along a longitudinal direction of the corresponding raised strip and is capable of guiding the limiting protrusion into the second groove; and the second groove is arranged on one side of the first groove, and the second groove extends along a radial direction of the rod body to form an arc-shaped slideway for the limiting protrusion to slide within.

* * * * *